Aug. 25, 1931.  N. E. LEES  1,820,234
CUTLERY AND THE LIKE
Filed Sept. 26, 1929
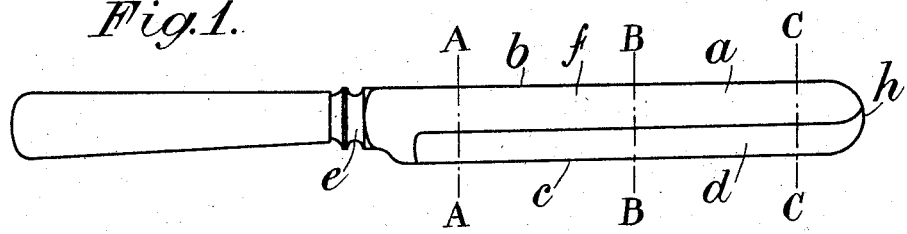
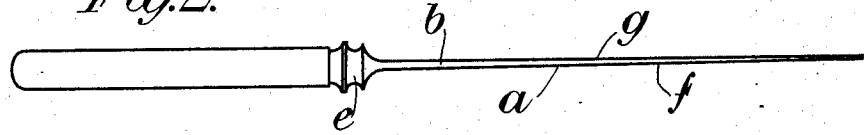
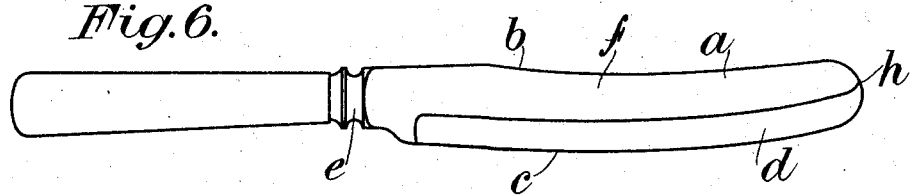
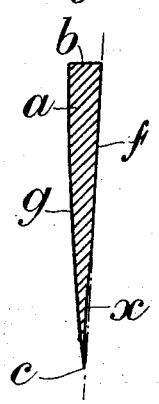
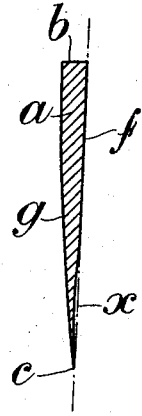
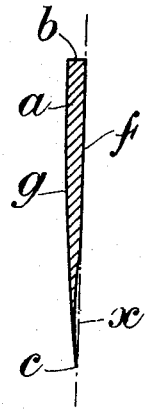
Inventor
Nora Elsa Lees,
by
Toulmin & Toulmin
Attorneys Patented Aug. 25, 1931 1,820,234

UNITED STATES PATENT OFFICE

NORA ELSA LEES, OF SHEFFIELD, ENGLAND

CUTLERY AND THE LIKE

Application filed September 26, 1929, Serial No. 395,234, and in Great Britain September 29, 1928.

This invention relates to cutlery and the like and has for its object to provide an improved form of knife blade which will have a sharp cutting edge at the part most required or used for cutting without materially weakening the blade.

According to this invention a knife blade is hollow ground on one side along the cutting edge, the cross sectional area of the blade at or near the part mainly used for cutting purposes being substantially less than the cross sectional area of the remainder. The reduction in the cross sectional area may be consequential to a tapering formation of knife blade where the blade tapers in thickness longitudinally as well as transversely or it may be achieved by grinding the hollow deeper at the requisite part.

Where the invention is applied to table and like knives the hollow increases in depth towards the point of the blade whereby a fine cutting edge is obtained at the requisite part used for cutting purposes while strength and rigidity is maintained along the length of the blade rearwardly from said part owing to the consequent increasing thickness in the cross section of the blade towards the tang end.

Preferably the form of blade employed is one which, in addition to the usual tapering cross section, tapers in thickness from the tang end to the point so that the hollow is therefore deepest at the thinnest part of the blade, resulting in a very keen edge thereat which is the part chiefly utilized in a table knife for cutting.

Preferably also, the side or face of the blade on which the hollow is formed is made flat and the opposite side is slightly rolled, rounded or made convex whereby the cutting edge of the blade occurs in a plane which lies midway or intermediate of the planes of the two sides or faces of the blade. In such a form of blade, therefore, the cutting edge lies almost centrally of the metal at the back thereof which thereby gives the maximum of strength to the edge and in addition the increasing thickness of the cross section of the blade rearwardly to the tang end also gives strength to the hole blade.

The form of blade made according to this invention may be adaptable to various kinds of knives, but is particularly adapted for table knives, especially of stainless steel.

It is equally applicable to all the known forms of blade, such as, for example, the straight blade and the scimitar form of blade.

Referring to the drawings filed herewith:—

Fig. 1 is an elevation of one form of knife (table knife with straight blade) made in accordance with this invention;

Fig. 2 is a plan;

Fig. 3 is a cross section on line A—A, Fig. 1;

Fig. 4 is a cross section on line B—B, Fig. 1;

Fig. 5 is a cross section on line C—C, Fig. 1;

Fig. 6 is an elevation of a similar form of table knife having a scimitar type of blade.

As will be seen in Fig. 2, the cross section of the blade $a$ tapers longitudnially from the tang end to the point and as seen in Figs. 3, 4 and 5, also from the back edge $b$ to the cutting edge $c$. One side of the blade alongside the cutting edge is hollow ground as shown at $d$ from within a short distance of the bolster $e$ to the point of the blade and is arranged so that it is deepest at, or gradually increases in depth towards, the point as is clearly indicated in Figs. 3, 4 and 5 by the arcs alongside the chain lines $x$, $x$ with the result that that part of the blade near the point which is mainly used as the cutting part of the knife has an extremely fine cutting edge and owing to the increasing thickness of the cutting edge rearwardly to the tang end, the strength of the blade is maintained.

As in the example shown, the face $f$ of the blade which is hollow ground may be flat above the hollow whilst the opposite face $g$ may be slightly rolled, rounded or made convex so that the cutting edge lies midway of the two faces of the blade with a substantial thickness of metal immediately at the back thereof for supporting said cutting edge.

In some cases the blade may be hollow ground near the end only instead of substantially the whole length.

Further the face of the blade which is hollow ground may be rolled, rounded or made convex in addition to the opposite face.

The hollow is, or may be, continued partly round the point as shown at $h$ in Figs. 1 and 6.

In a knife made according to this invention it will be found that a much finer and more permanent cutting edge is produced than has hitherto been possible with other known forms owing to the fact that the cutting part of the knife occurs at the thinnest part owing to the hollow being deepest at said part.

What I claim and desire to secure by Letters Patent is:—

1. A knife having its blade hollow ground on one face thereof alongside the cutting edge, said blade tapering in thickness longitudinally towards the point and the hollow increasing in fulness towards the point.

2. A knife having its blade hollow ground on one face thereof alongside the cutting edge, said blade tapering in thickness longitudinally towards the point and the hollow increasing in fulness towards the point and being carried partly round said point.

3. A knife having its blade hollow ground on one face thereof alongside the cutting edge, said blade tapering in thickness longitudinally towards the point, the hollow increasing in fulness toward the point and the other face of the blade being convex.

4. A knife comprising a blade, a handle to the blade, said blade having obversely a longitudinal flat surface and a hollow ground surface adjacent thereto alongside the cutting edge of the blade and, reversely, a convex surface, said blade tapering in thickness longitudinally towards the point thereof and transversely to the cutting edge of the blade and said hollow increasing in fulness towards said point.

In testimony whereof, I affix my signature.

NORA ELSA LEES.